US011537961B2

(12) United States Patent
Hodges et al.

(10) Patent No.: US 11,537,961 B2
(45) Date of Patent: Dec. 27, 2022

(54) FORECASTING SYSTEM

(71) Applicant: Walmart Apollo, LLC, Bentonville, AR (US)

(72) Inventors: Timothy Ryan Hodges, Bentonville, AR (US); Christopher Wade Spencer, Garfield, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/853,951

(22) Filed: Apr. 21, 2020

(65) Prior Publication Data

US 2020/0334617 A1 Oct. 22, 2020

Related U.S. Application Data

(60) Provisional application No. 62/836,787, filed on Apr. 22, 2019.

(51) Int. Cl.
G06Q 10/00 (2012.01)
G06Q 10/06 (2012.01)

(52) U.S. Cl.
CPC . *G06Q 10/063118* (2013.01); *G06Q 10/0633* (2013.01)

(58) Field of Classification Search
CPC .............................................. G06Q 10/063118
See application file for complete search history.

(56) References Cited

U.S. PATENT DOCUMENTS

| 5,557,513 | A | * | 9/1996 | Frey | ................... | G06Q 10/0631 |
| | | | | | | 705/7.12 |
| 7,240,027 | B2 | | 7/2007 | McConnell et al. | | |
| 7,987,105 | B2 | | 7/2011 | McNeill et al. | | |
| 9,117,223 | B1 | * | 8/2015 | Handel | ............. | G06Q 30/0252 |
| 9,135,559 | B1 | | 9/2015 | Chan et al. | | |
| 9,727,616 | B2 | | 8/2017 | Wu et al. | | |
| 2004/0193473 | A1 | | 9/2004 | Robertson | | |
| 2005/0165520 | A1 | | 7/2005 | Ariyur | | |
| 2005/0187972 | A1 | * | 8/2005 | Kruger | ............... | G06Q 30/0204 |
| 2007/0021999 | A1 | | 1/2007 | Whalen et al. | | |
| 2008/0016047 | A1 | | 1/2008 | Dettinger | | |
| 2008/0059278 | A1 | | 3/2008 | Medina et al. | | |
| 2008/0091498 | A1 | | 4/2008 | Chiverton | | |

(Continued)

FOREIGN PATENT DOCUMENTS

AU    2009202215 A1    12/2009
CA       3078874      10/2020

(Continued)

OTHER PUBLICATIONS

Melo et. al. , Dynamic Multi-Commodity Capacitated Facility Location: A mathematical modeling framework for strategic supply chain planning, 2005, Computers and Operations Research, 33, 181-208. (Year: 2005).*

(Continued)

*Primary Examiner* — Hafiz A Kassim
*Assistant Examiner* — Zahra Elkassabgi
(74) *Attorney, Agent, or Firm* — Fitch, Even, Tabin & Flannery LLP

(57) ABSTRACT

Described in detail herein is a forecasting system. In one embodiment, the system can generate forecast data for amount of labor and physical objects needed at various facilities.

20 Claims, 15 Drawing Sheets

(56) References Cited

U.S. PATENT DOCUMENTS

| | | |
|---|---|---|
| 2008/0262894 A1 | 10/2008 | Podrazhansky |
| 2008/0300954 A1 | 12/2008 | Cameron |
| 2010/0185486 A1* | 7/2010 | Barker .................. G06Q 10/06 705/7.31 |
| 2013/0262174 A1 | 10/2013 | Singh et al. |
| 2014/0279208 A1 | 9/2014 | Nickitas et al. |
| 2015/0120351 A1 | 4/2015 | Dorner |
| 2015/0134413 A1 | 5/2015 | Deshpande et al. |
| 2015/0178671 A1* | 6/2015 | Jones .................. G06Q 10/087 705/28 |
| 2016/0110662 A1 | 4/2016 | Dispoto |
| 2016/0260052 A1 | 9/2016 | Ray et al. |
| 2017/0278053 A1 | 9/2017 | High et al. |
| 2018/0247534 A1* | 8/2018 | Williams ............... G08G 1/142 |
| 2019/0156253 A1 | 5/2019 | Malyack |
| 2019/0360165 A1 | 11/2019 | Nilsson |
| 2020/0334618 A1 | 10/2020 | Hodges |

FOREIGN PATENT DOCUMENTS

| | | | |
|---|---|---|---|
| CA | 3078874 A1 * | 10/2020 | ..... G06Q 10/063118 |
| CA | 3078881 | 10/2020 | |

OTHER PUBLICATIONS

Tanzaki et al., Demand Forecasting in Restaurants using Machine Learning and Statistical Analysis, 2018, Conference on Intelligent Computation in Manufacturing Engineering. (Year: 2018).*

Labor Management System Implementation, https://www.heathandco.com/hospitality-advisor-consulting-services-labor-management-system-implementation.shtml#nolink, Copyright 2018 Heath & Company—Hospitality Advisors LLC.

Improve Warehouse Employee Engagement & Productivity, Manhattan Associates, https://www.manh.com/products/labor-management, 2018.

Khan, Muhammad Adnan, et al.; "Effective Demand Forecasting Model Using Business Intelligence Empowered With Machine Learning"; IEEE Access; 2020; vol. 8; pp. 116013-116023; doi: 10.1109/ACCESS.2020.3003790.

U.S. Appl. No. 16/853,965; Office Action dated Jan. 26, 2022.

U.S. Appl. No. 16/853,965; Office Action dated Jun. 10, 2022; (31 pages).

* cited by examiner

FIG. 3 — CONTINUED

FIG. 5
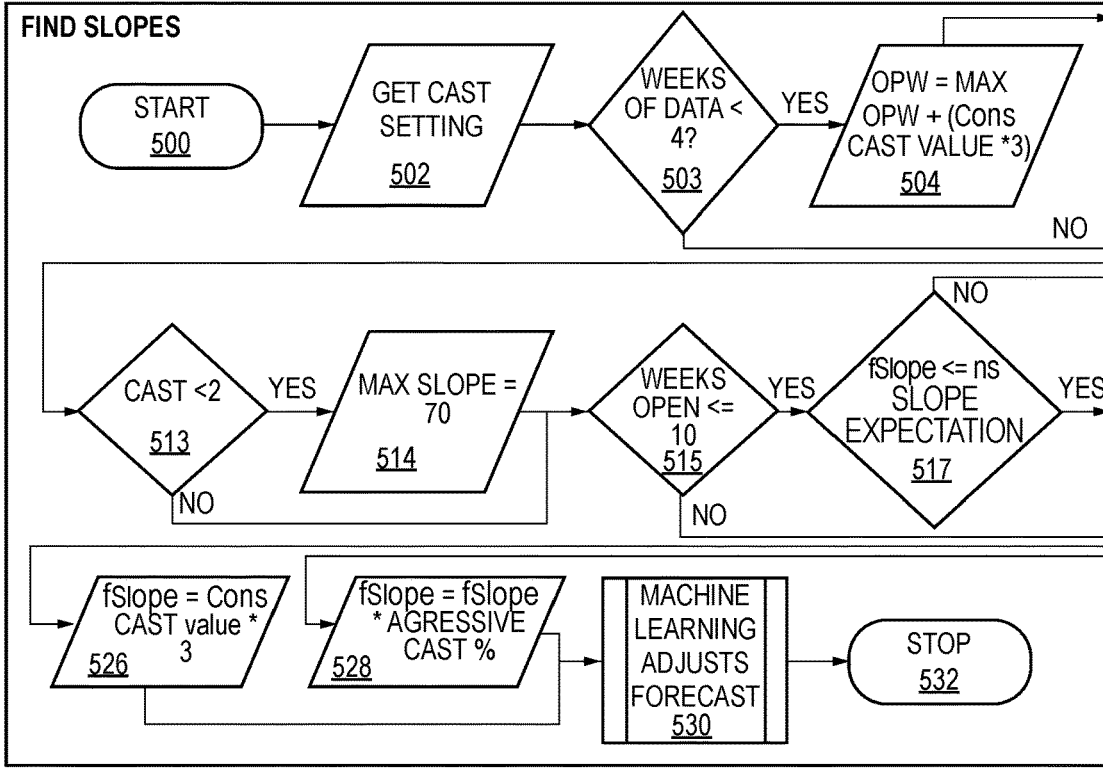
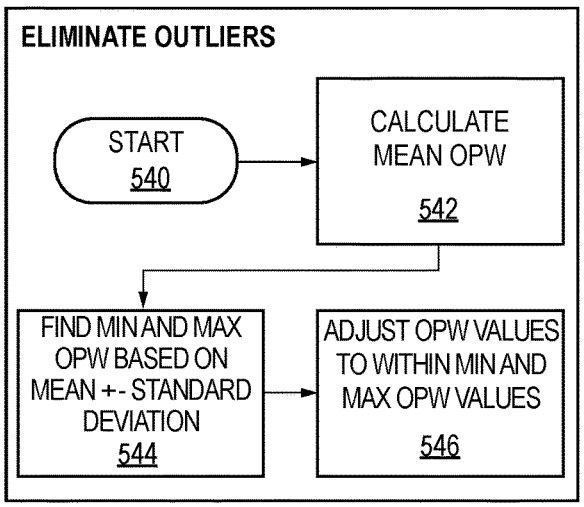
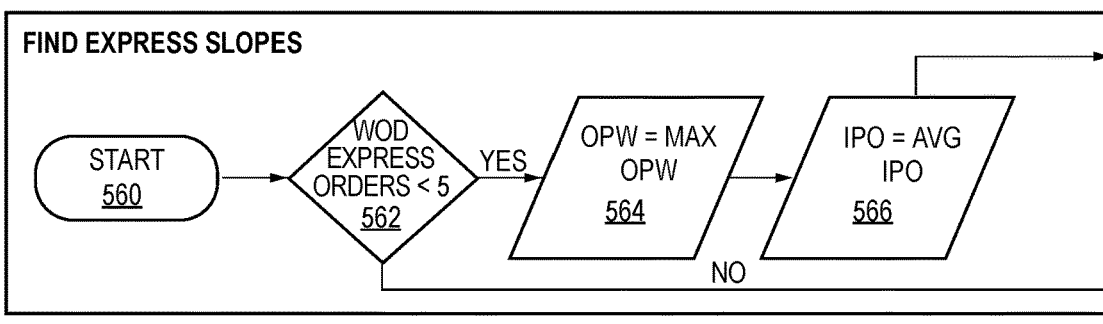
FIG. 5 → CONTINUED

FIG. 5 CONTINUED
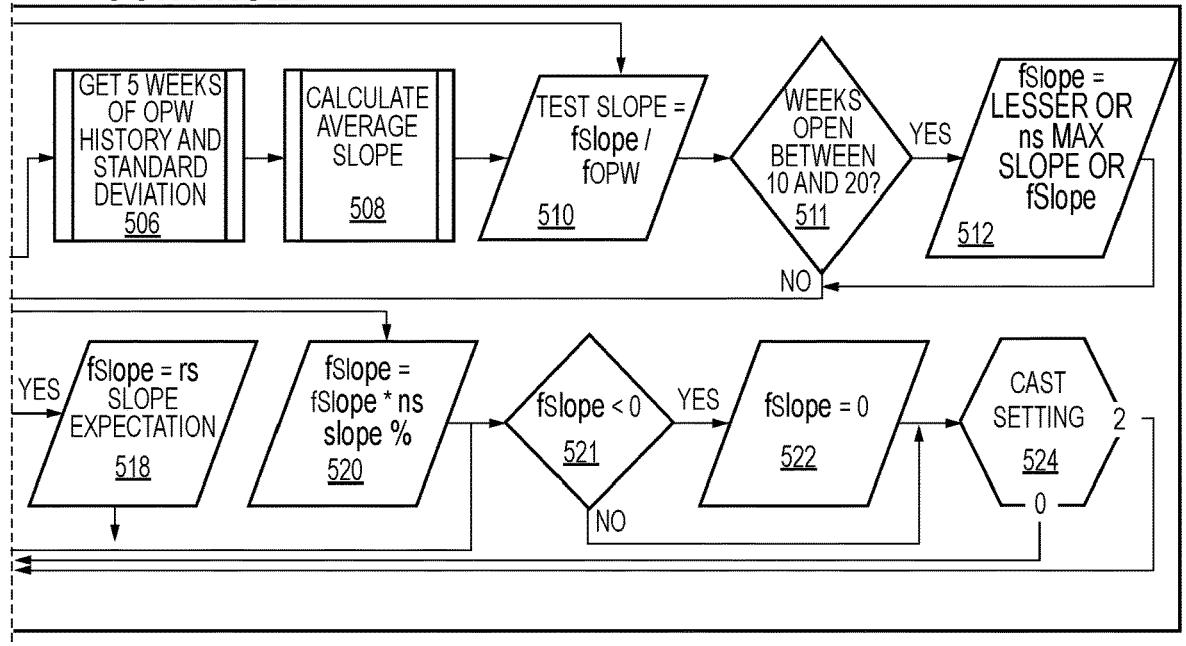
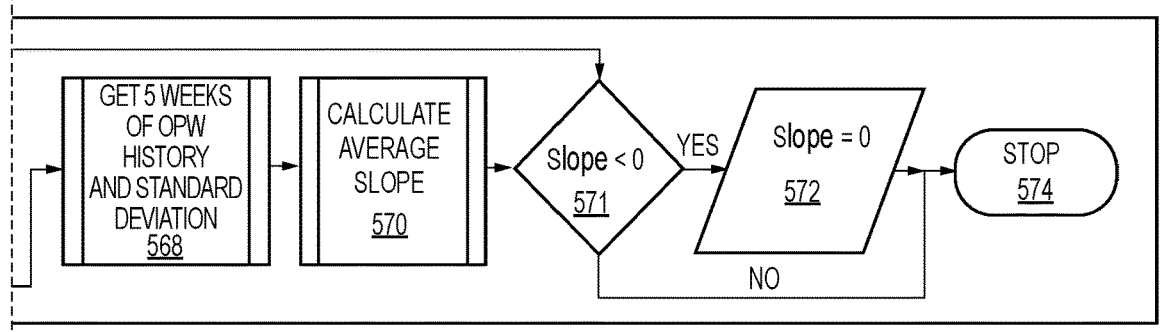

FORECASTING SYSTEM

CROSS REFERENCE TO RELATED APPLICATIONS

The present application claims the benefit of U.S. Provisional Patent Application No. 62/836,787, filed on Apr. 22, 2019, which is incorporated herein by reference in its entirety.

BACKGROUND

The operations of particular facilities such as distribution centers and retail facilities require the scheduling of workers at the facilities. Different times, days, weeks and/or months require different amounts of workers for optimal facility performance.

BRIEF DESCRIPTION OF DRAWINGS

Illustrative embodiments are shown by way of example in the accompanying drawings and should not be considered as a limitation of the present disclosure:

FIG. 5 depicts a process of generating slope data in accordance to an exemplary embodiment.

DETAILED DESCRIPTION

Figure 1:
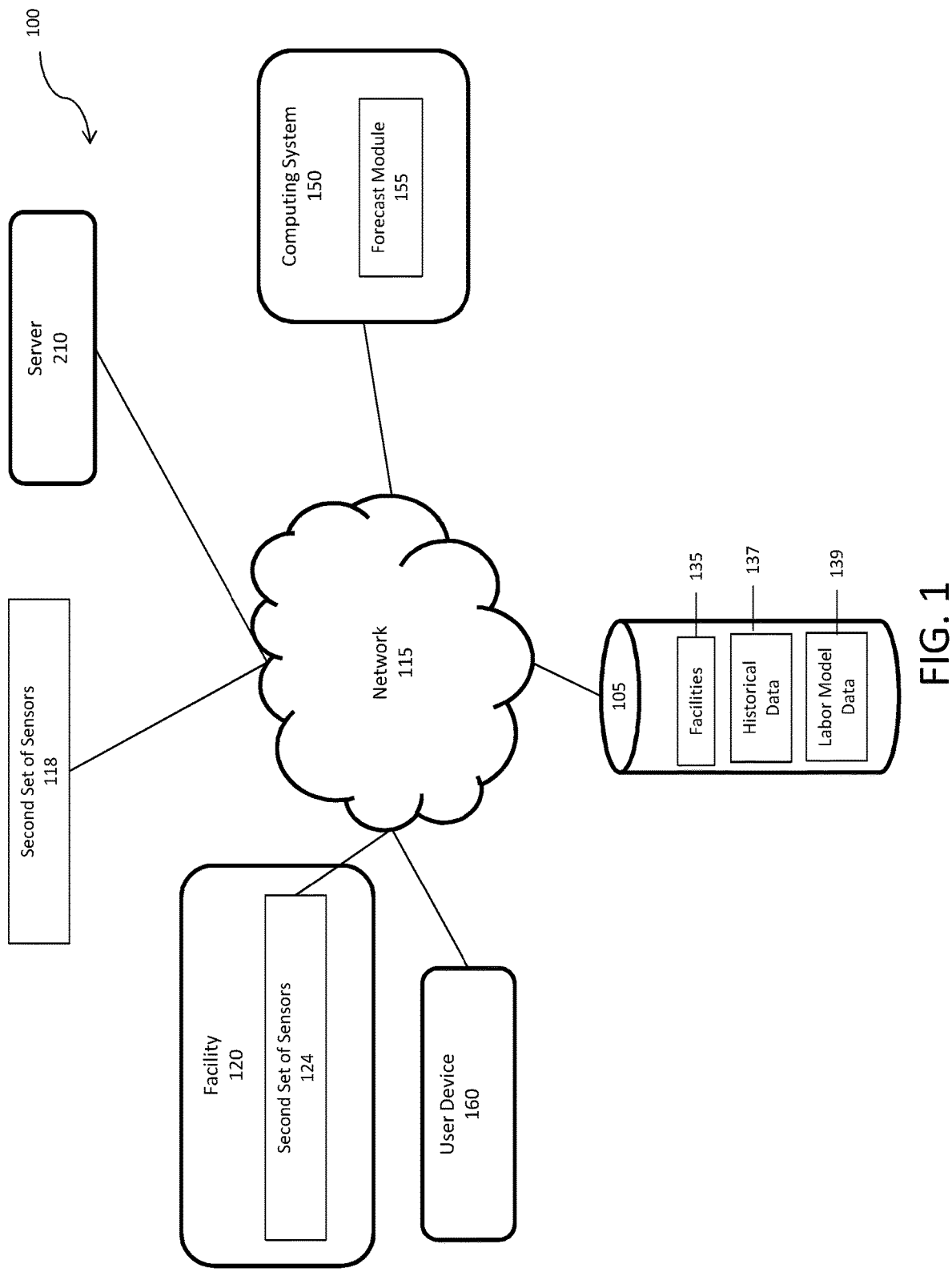
FIG. 1 is a network diagram of a forecasting system according to exemplary embodiments of the present disclosure.

Described in detail herein is an exemplary forecasting system for forecasting an amount of workers needing to be scheduled at a facility. In one embodiment, the forecasting system can include a first set of sensors disposed outside a facility that are configured to detect a first set of data and a second set of sensors disposed inside the facility that are configured to detect a second set of data. For example, the first set of sensors may detect vehicle and customer traffic outside the facility and the second set of sensors may detect physical objects such as items in the facility and/or customer traffic in the facility. It will be appreciated that other types of data may also be detected by the first and second set of sensors. The system can further include a computing device equipped with one or more processors that is in communication with the first set of sensors, the second set of sensors, and a database. The computing system can be configured to execute a forecast module. The forecast module when executed can receive the first and second set of data from the first and second set of sensors, retrieve historical data associated with a group of physical objects disposed in the facility, and generate forecast data indicating an amount of workers needing to be scheduled in the facility for a specified period of time. The forecast data can be associated with an amount of physical objects predicted to be retrieved from the facility based on the first set of data, the second set of data, and the historical data. The forecast module can further determine capacity data based on a maximum capacity of the facility to retrieve physical objects over the specified period of time, modify the forecast data based on the capacity data, and generate a labor model based on the forecast data. The labor model may be used to determine an amount of workers required to support the forecasted retrieval of physical objects from the facility.

In one embodiment, a forecasting method for forecasting an amount of workers needing to be scheduled at a facility can include detecting a first set of data via a first set of sensors disposed outside a facility, detecting a second set of data via a second set of sensors disposed inside the facility, and executing a forecast module via a computing device in communication with the first set of sensors, the second set of sensors, and a database. The forecast module receives the first and second set of data from the first and second set of sensors, retrieves, historical data associated with a group of physical objects disposed in the facility, and generates, forecast data indicating an amount of workers needing to be scheduled in the facility for a specified period of time. The forecast data can be associated with an amount of physical objects predicted to be retrieved from the facility based on the first set of data, the second set of data, and the historical data. The method can further include determining, via the forecast module, facility capacity data based on a maximum capacity of the facility to retrieve physical objects over the specified period of time, modifying, via the forecast module, the forecast data based on the capacity data, and generating, via the forecast module, a labor model based on the forecast data, the labor model used to determine an amount of workers required to support the forecast retrieval of physical objects from the facility.

FIG. 1 is a network diagram of the forecasting system 100 according to an exemplary embodiment of the present disclosure. The forecasting system 100 can include one or more databases 105, one or more servers 110, one or more computing devices 150, a first set of sensors 118 disposed outside a facility 120, and a second set of sensors 124 disposed inside a facility 120. In exemplary embodiments, the computing device 150 can be in communication with the databases 105, the server(s) 110, first set of sensors 118, and second set of sensors 124, via a communications network 115. The computing device 150 can execute a forecast module 155 to implement the forecasting system 100.

In an example embodiment, one or more portions of the communications network 115 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 110 includes one or more computers or processors configured to communicate with the computing device 150, databases 15, first set of sensors 118, and second set of sensors 120, via a communications network 115. The server 110 hosts one or more applications configured to interact with one or more components of computing device 150 to access the content of the databases 105. The databases 105 may store information/data, as described herein. For example, the databases 105 can include a facilities database 135, a historical data database 137, and a labor model database 139. The facilities database 135 can store information associated with facilities. The historical data database 137 can store historical data associated with facilities such as transaction data and the number of people frequenting the facilities over time. The labor model database 139 can store labor models generated for various facilities indicating the amount of labor employed at various time periods. The databases 105 can be located at one or more geographically distributed locations from the computing device 150. Alternatively, the databases 105 can be located at the same geographically as the computing device 150.

In one embodiment, the forecast module 155 can forecast an amount of physical objects to be retrieved from the facility at any given time based on requests received for retrieval of physical objects from a facility 120 from a user device 160. The forecast module 155 can receive a first set of data from the first set of sensors 118 disposed outside the facility 120. As an example, the first set of sensors 118 can be disposed in a parking lot of a facility. The first set of data can include an amount of cars, objects, and/or people outside the facility. The forecast module 155 can also receive a second set of data from the second set of sensors 124 disposed inside the facility 120. The second set of data can include data associated with the detection of objects or an amount of customer traffic within the facility. In one embodiment, the first and second set of sensors 118, 124 can stream the first and second set of data to the computing system. Alternatively, the first and second set of sensors 118, 124 can transmit the first and second set of data to the computing device executing the forecast module 155 after a specified period of time.

The forecast module 155 can retrieve information associated with the facility from the facilities database 135 and historical data from the historical data database 137. The forecast module can generate forecast data indicating an amount of workers needing to be scheduled in the facility for a specified period of time when the physical objects are to be retrieved based on the received requests. The forecast module 155 can remove any outlier data from the forecasted amount of physical objects to be retrieved from the facility before generating the forecast data. The forecast data can be generated based on an amount of physical objects to be retrieved from the facility, the first set of data, the second set of data, information associated with the facility, and the historical data. In one embodiment, the information associated with the facility can include the size of the facility, location of the facility, and amount of people that frequent the facility at any given time of day and week. The historical data can include information associated with data related to amount of people frequenting the facility at any given time historically and amount of physical objects being retrieved from the facility during a time period. The forecast module 155 can also determine the capacity information associated with the maximum capacity of a facility to retrieve physical objects at a specified period of time. The forecast module 155 can modify the forecast data based on the capacity data. The forecast module 155 can generate a labor model based on the forecast data. The labor model can indicate the amount of workers required to support the forecasted retrieval of physical objects from a facility.

In one embodiment, the forecast module 155 can forecast data for a specified time of four weeks or less. The historical data can include data associated with a frequency and amount of physical objects retrieved from the facility over the same specified amount of time of four weeks or less historically, based on time of year, season, and/or weather.

In one embodiment, the labor model can include a schedule of workers scheduled to be working at the facility during the operating hours for a specified time period (i.e., four weeks). The forecast module 155 can dynamically update the forecast data and/or labor model based on a change in the first set of data, second set of data, forecast of physical objects to be retrieved from the facility, facility information, and/or historical data. For example, a change in vehicle or customer traffic outside the facility, a change in physical objects detected inside the facility (e.g. a change in item inventory) and/or a change in customer traffic in the facility may cause the forecast module to update the forecast data and/or labor model. The change in the forecast data and/or labor model can trigger the forecast module 155 to dynamically adjust the schedule of workers to scheduled be working at the facility.

In one embodiment, the forecast module 155 can receive a request to generate forecast data. The forecast module 155 can open data tables of labor model data database in response to the request. The request can include a specified amount of time for which the forecast data is to be generated. The forecast module 155 can determine a current time in relation to the specified amount of time for which the forecast data is to be generated. The forecast module 155 can generate temporary tables in the labor model data database 139 associated with delivery or retrieval of physical objects disposed in facilities. The forecast module 155 can load variables associated with each facility in the labor model data database 139. The forecast module can generate slope data, representing a calculated change in orders or items week over week, for each group of facility data accessed from the open data tables in the facilities database 135, historical data database 137, and labor model data database 139, and the temporary data tables in the labor model data database 139 associated with the delivery or retrieval of physical objects disposed in the facility. The forecast module 155 can generate forecast data for the specified amount of time. The forecast data can include predictive data associated with a quantity of physical objects to be disposed in each facility and a quantity of physical objects to be retrieved from or delivered from each facility of a group of facilities, using the generated slope data. The forecast data can be iteratively updated based on updates to the slope data.

The forecast module 155 is configured to generate the forecast data to include predictive data associated with labor hours required at each facility over the specified amount of time to support the quantity of physical objects to be disposed in each facility and the quantity of physical object to be retrieved from or delivered from each facility based on the physical object predictive data associated with the physical objects. Put another way, the forecast data may be used to estimate the amount of work expected to be performed at the facility to deliver and maintain objects at the facility and to fulfill customer orders. The forecast module 155 can eliminate outlier data from the generated slope data.

The forecast module can delete the temporary data tables subsequent to generating the forecast data. The forecast module can iteratively update the slope data as the inputs are updated in real-time.

The forecast module 155 can transmit the forecast data to the user device 160 to be rendered on the display of the user device.

As a non-limiting example, the forecasting system 100 can be implemented in a retail store environment. The forecasting system 100 can forecast amount of items that are retrieved from a facility at any given time of day or day of the week. Based on the forecasted items to be retrieved from the facility, the forecasting system 100 can generate forecast data indicating an amount of workers needing to be scheduled in the retail store. For example, customers can purchase items to be picked up at the retail store using their user devices 160. The customers can come at various times of the week or day to pick up the purchased items. The forecast module 150 can forecast amount of workers needed at a retail store to assist with the amount of items to be picked up by customers throughout the day and weeks. The forecast data can be generated based on a forecasted amount of items to be retrieved from the facility, the first set of data, the second set of data, information associated with the facility, and the historical data. The forecast module can generate a labor model based on the forecast data. The labor model can include a schedule for the workers to work at the retail store in anticipation for the amount of items to be retrieved by customers in the retail store throughout the day and weeks.

Figure 2:
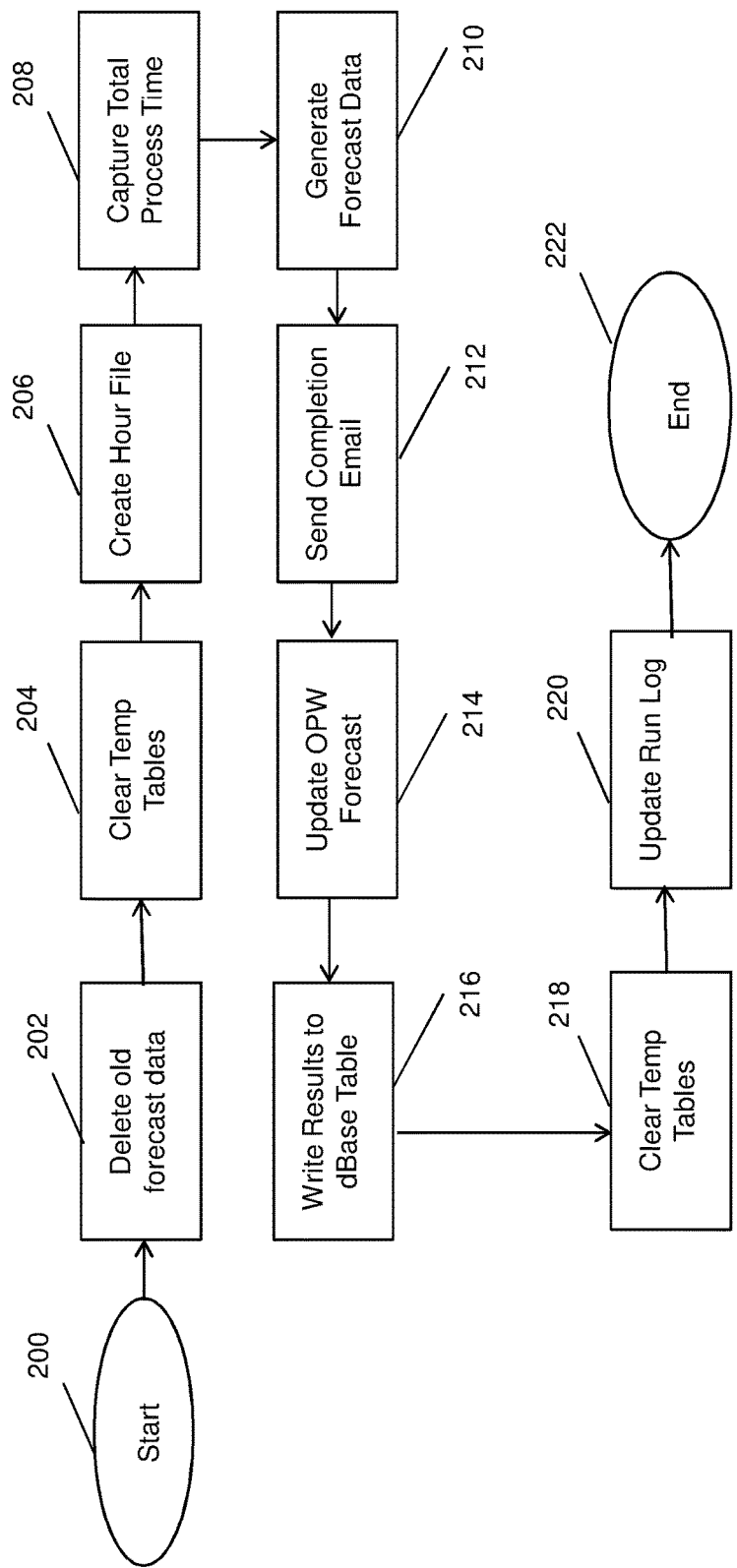
FIG. 2 depicts a process of generating forecast data in accordance with an exemplary embodiment.

FIG. 2 depicts a high level view of the process of generating forecast data. In operation 200, a forecast module (e.g., forecast module as shown in FIG. 1) can initiate a process to generate forecast data. In operation 202, the forecast module can delete existing forecast data. In operation 204, the forecast module can clear temp tables created from previous forecasting operations. In operation 206, the forecast module can create an hour file. The hour file can be associated with labor hours required at the facility. In operation 208, the forecast module can capture total process time representing the total time, in seconds, that the forecast process requires to complete. In operation 210, forecast data may be generated as discussed further below. In operation 212, the forecast module can transmit an email indicating a completion of generating the forecast data. For example, the email may be sent to a distribution list which may include the team that supports the process and any stakeholders who are dependent upon the resulting data\reports. In operation 214, an order per week (OPW) forecast can be updated based on the generated forecast data which may be used with a forecast IPW (items per week) to calculate the hours needed to work the forecast volume for a given week. In operation 216, the forecast module may write the results indicating the forecast data and OPW forecast to a database table to allow for maintenance of the results as historical forecast information and to allow for future test and analysis purposes. In operation 218, the temp tables are cleared again. In operation 220, an update run log is executed to update the OPW forecast. In operation 222, the process is terminated.

Figure 3:
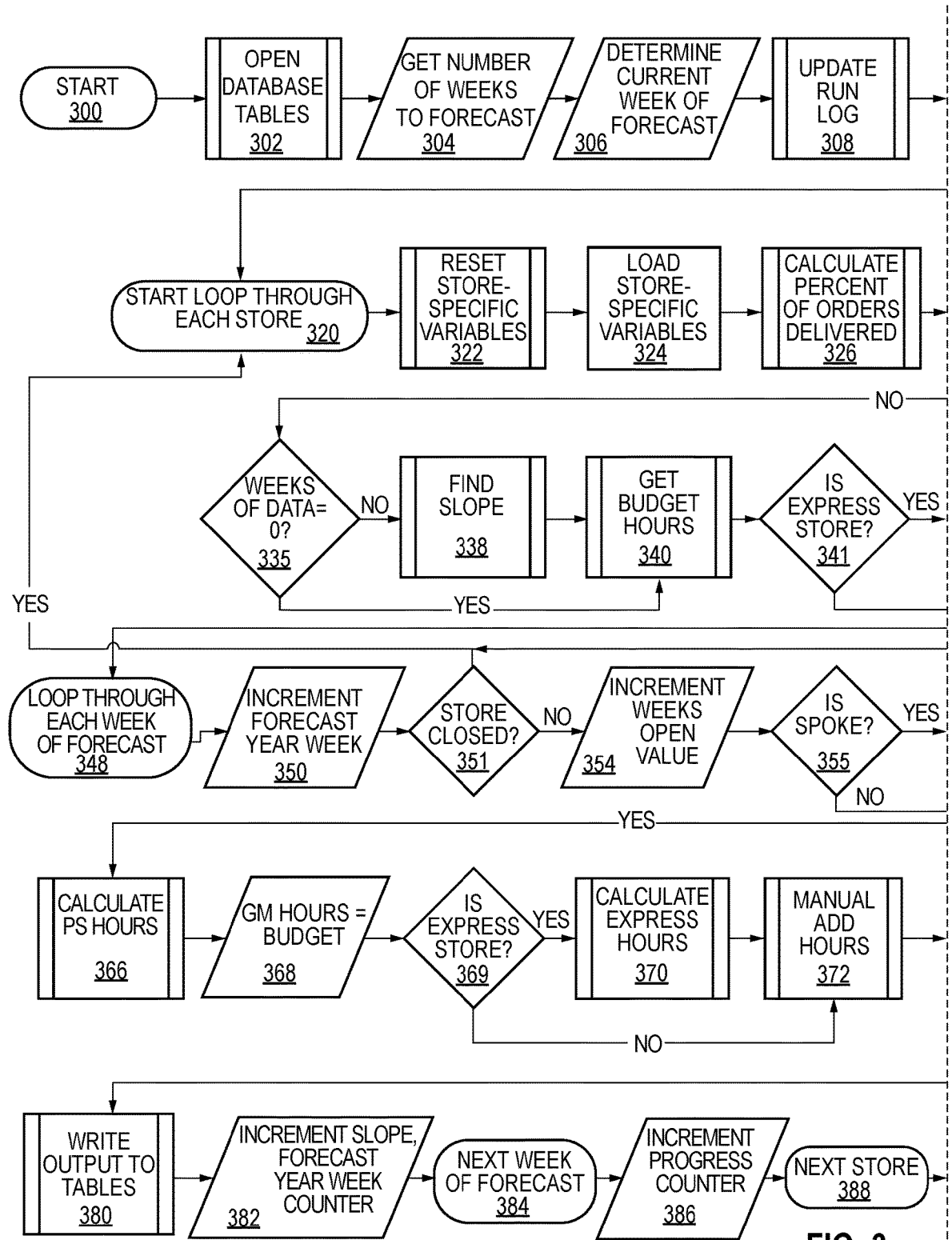
FIG. 3 depicts a process of generating forecast data for specified times and facilities in accordance with an exemplary embodiment.
Figure 3:
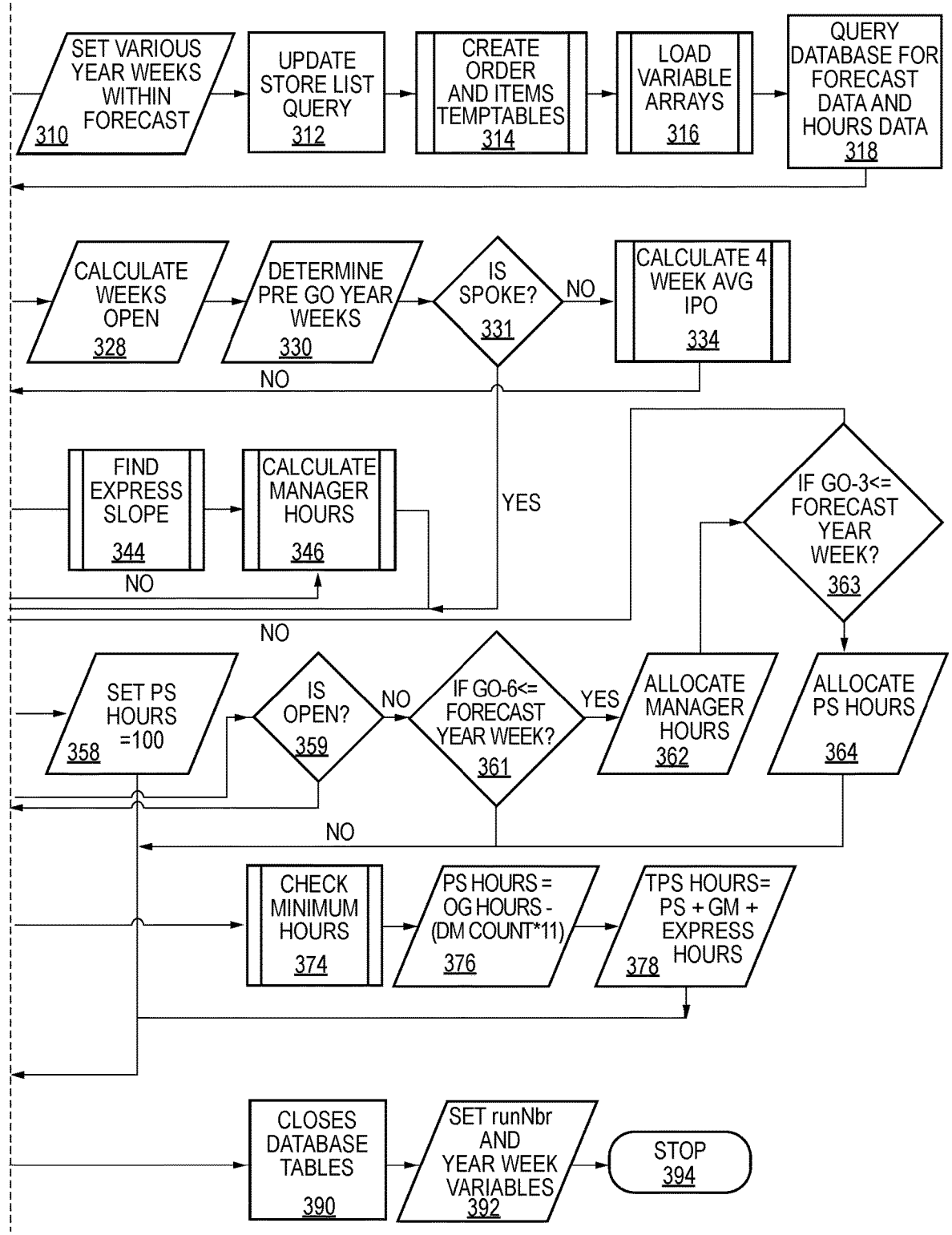

FIG. 3 depicts a process of generating forecast data for specified times and facilities. In operation 300, the forecast module (e.g., forecast module 155 as shown in FIG. 1) can initiate the process of generating forecast data for specified times and facilities. In operation 302, the forecast module can open database tables in the databases (e.g., databases 105 as shown in FIG. 1 including the facilities database 135; historical data database 137; and labor model data database 139). In operation 304, the forecast module can determine a specified amount of time (i.e., days or weeks) for generating forecast data based on user input or previously specified criteria. In operation 306, the forecast module can determine the current time and date with respect to the specified amount of time. In operation 308, the forecast module can execute the update run log.

In operation 310, the forecast module can set the specified amount of time for which the forecast data is to be generated for. In operation 312, the forecast module can execute a query to the databases to retrieve information associated with the facilities. In operation 314, the forecast module can generate temporary tables for orders and physical objects expected to be retrieved from the facilities based on the retrieved information associated with the facilities. In operation 316, the forecast module writes the variables into a temporary table (a table of data loaded into cache memory for faster access). Loading the variables into this table allows for reduced process time. In operation 318, the forecast module can query the databases for current forecast data and worker hours data. In operation 320, the forecast module can execute the process for each individual facility.

In operation 322, the forecast module can reset facility-specific variables in the databases. In operation 324, the forecast module can load facility specific variables in the databases. The variables can include but are not limited to: facility size, location, dimensions, type, physical objects disposed in the facility such as items for sale and capacity of the facility. In operation 326, the forecast module determines a percentage of physical objects to be delivered. In operation 328, the forecast module can determine a number of weeks the facility will remain open. In operation 330, the forecast module determines pre-GO (grand-opening) for a specified number of years or weeks. Pre-GO is the facility training period before the operation opens. A minimum number of items/orders are given to a store pre-GO (grand-opening) by the forecast module so that the store starts with a minimum number of hours and can begin hiring and training new staff. The forecast module sets the items and orders to a minimum value so that training hours are generated so that the store can hire and train staff. The minimum volume given depends on the size and format of the store and is based on a pre-determined matrix. In operation 331, the forecast module can determine the type of facility (i.e., spoke or hub). A hub is a location that picks, or shops, for customer items in an order. The hub may or may not have dispense capabilities, which means dispensing the picked orders to a spoke, customer or delivery service. A spoke is a store that only has dispense services and receives all picked orders from a hub. In response to determining that the facility is not a spoke facility, in operation 334, the forecast module can determine a forecast IPO (Items per order) in the same manner used to determine OPW. In operation 335, the forecast module can determine whether the weeks of data equals 0. In response to determining the weeks of data does not equal 0, in operation 338, the forecast module finds a slope of the data of the facility representing the predicated week over week change in orders and is calculated using a modified Bayesian predictive statistical method. In operation 340, following operation 338 or in response to determining the weeks of data equals 0, the forecast module can retrieve the budget hours for the facility. The budget hours are the weekly hours budgeted for a store during a quarterly budget process. In operation 341, the forecast module can determine whether the facility is an express facility, a hub that provides order filling capabilities under the typical 4 hour SLA (Service Level Agreement). Depending on the option the customer chooses this could mean picking orders in a time frame between 30 minutes and 2 hours. This requires a separate labor model calculation because of the change in process which means the volume must be forecast separately. In response to determining the facility is an express facility, in operation 344, the forecast module can determine an express facility slope for the data specific to express facilities. In operation 346, following operation 344 or in response to determining the facility is not an express facility, the forecast module can calculate manager hours (depending on the volume of the picking operation (in orders per week) a facility is allocated a specific number of manager hours to manage the hourly associates used to staff the operation).

In operation 348, following operation 346 or in response to determining the facility is a spoke store in operation 331, the forecast module and loop through each week of the forecast data for expected sales at the store. In operation 350, the forecast module can increment each forecast week of the year to a specific week. In operation 351 the forecast module can determine whether the facility is closed. In response to determining the facility is closed the process can return to operation 320 and execute the process for a different facility. In response to determining the facility is not closed, in operation 354, the forecast module can increment each week the facility is open in the year. In operation 355 the forecast module can determine whether the facility is a spoke facility. In response to determining the facility is a spoke facility, in one embodiment, in operation 358, the PS (personal shopper) hours can be set to 100 (representing 12 hours a day, 7 days a week with an additional 16 hours (2 shifts) included) to provide management hours that may be shared with another department. In response to determining the store is not a spoke facility, in operation 359, the forecast module can determine whether the facility is open. In response to determining the facility is not open, in operation 362 and it is less than 6 weeks prior to GO (grand opening) the forecast module allocates manager hours so that the facility can hire a manager and begin the training process. If it is determined that it is GO-3 (3 weeks prior to GO) the forecast module begins allocating PS hours so that the store can hire and train the hourly staff that will shop, or pick, and dispense the customer orders once the operation opens.

In response to determining the facility is open in operation 359, in operation 366, the forecast module can calculate PS hours. In operation 368, forecast module can set GMHours equal to the budget. GM hours are hours used to shop general merchandise related items (versus grocery). The picking process for GM differs from the grocery process so it requires a separate labor model which generates the hours specific to this store and operation. In operation 369, the forecast module can determine whether the facility is an express facility. In response to determining the facility is an express facility, in operation 370 the forecast module can calculate the express hours of the facility. Express hours are the hours allocated to the store for the express pickup operation. In operation 372, following operation 370 or in response to determining the facility is not an express facility in operation 369, hours can be manually added Manual hours include any "flat" hours (hours not calculated based on a metric or specific workload) that are required in the store because of a test or customer proposition. An example of this would be 84 hours (12 hours per day, 7 days per week) in store X required to staff a kiosk. In operation 374, the forecast module can check the minimum number of hours in the facility. In operation 376, the PS hours can be set as OG Hours less the DMCount*11. DM count is "Department Manager" count. Department managers work 40 hours per week but in one embodiment, 29 of those hours are spent acting as a personal shopper which means they are already included in the demand hours for personal shoppers that have been calculated by the labor model. The 11 hours remaining (40-29) are fixed hours during which the DM acts in an administrative or managerial role. In operation 378, the TPSHours can be set as PS plus GM plus express hours. TPSHours are "total personal shopper hours" which are the personal shopper hours needed to pick and dispense grocery orders PLUS GM (general merchandise) orders. This is the total number of hours for the entire, integrated pickup operation at a store for a week.

In operation 380, following operation 378, operation 358, or determining GO-6 is not less than or equal to the forecast of the specific week in the year in operation 361, the forecast module can write the output to the tables in the databases. In operation 382, the forecast module can increment the slope, forecast based on the specified week in the year. Once a slope is forecasted (change in orders week over week, the resulting orders are calculated for a given week by incrementally adding the forecasted slope (in orders) for each week up to the chosen week. For example, if the slope is 10 and the chosen week is 6 weeks in the future then the resulting orders per week is current orders per week PLUS (10*6). In operation 384, the process can proceed to the next week of forecast. In operation 386 the forecast module can increment the progress counter. In operation 388, the process can proceed to the next facility. In operation 390, the forecast module can close the database tables that were opened in operation 302. In operation 392, the forecast module can set runNbr and specific year in the week variables. The runNbr is a unique process identifier used to tie a specific forecast process to its output data across multiple database tables. In operation 394, the process can be terminated.

Figure 4:
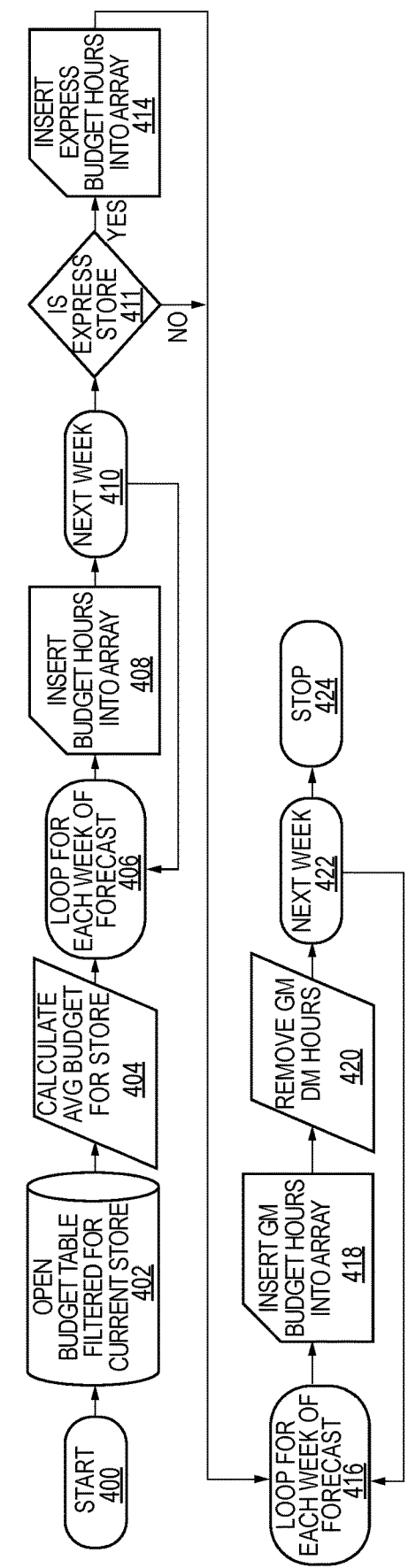
FIG. 4 depicts a process of generating budget data in accordance with an exemplary embodiment.

FIG. 4 depicts a process of generating budget data in accordance with an exemplary embodiment. In operation 400, the process of generating budget data for a facility can be initiated. The process of generating budget data can generate budget data for a facility for each week of the forecasted data that was calculated as described in FIG. 3. In operation 402, the forecasting module (e.g., forecasting module 155 as shown in FIG. 1) opens a budget table filtered by facility in the databases (e.g., databases 105 as shown in FIG. 1 including the facilities database 135; historical data database 137; and labor model data database 139). In operation 404, the forecast module can calculate an average budget of hours for each facility based on the forecast data. In operation 406, the forecast module can repeat the next step (operation 408) for each week of the generated forecast. In operation 408, the budget hours can be inserted in the array of the table. In operation 410, the forecast module can iterate to the next week by returning to operation 406.

In operation 411, the forecast module can determine whether the facility, is an express facility. In response to the forecast module determining the facility is an express facility, in operation 414, the forecast module can insert express budget hours into the array, as noted above, these are the hours specific to the express pickup operation. In operation 416, immediately following operation 414, or in response to determining the facility is not an express facility in operation 412, the forecast module can initiate the next steps for a given week in the forecast. In operation 418, the forecast module can insert gm budget hours in the array. GM hours are the equivalent of the previously described budget hours but are related specifically to the GM picking operation. In operation 420, the forecast module can remove GM DM hours. The GM DM hours are the Department Manager hours for the GM picking operation. In operation 422, the forecast module can iterate to the next week in the forecast by returning to operation 416. In operation 424, the process can be terminated after the forecast module has generated budget data for each week in the forecast.

FIG. 5 depicts a process of generating slope data in accordance with an exemplary embodiment. In operation 500, the process of find a slope can be initiated. In operation 502, the forecast module (e.g., forecast module 155 as shown in FIG. 1) can retrieve a capacity management system setting tool that allows a field based manager to specify how aggressively the capacity management system increases the capacity in stores. By referencing each facility's capacity management system setting, the forecast module may produce more accurate predictions of volume increase. In operation 503 the forecast module determines whether the weeks of data are less than 4. In operation 504, in response to the weeks of data is less than four, the forecast module sets the OPW to equal Max OPW+(Cons capacity management system setting value*3). This calculation determines the practical maximum number of orders the store is capable of in a specific week based on its physical size and the theoretical system capacity based on the capacity management system setting. In operation 506, in response to determining the weeks of data is greater than or equal to four, the forecast module can retrieve five weeks of OPW history and standard deviation between each consecutive order per week. In operation 508, the forecast module can calculate an average slope based on the five weeks of OPW history, standard deviation, and capacity management system setting.

In operation 510, following operation 508, or in response to the forecast module setting the OPW to equal Max OPW+(Conscapacity management system setting value*3) in operation 504, the forecast module can set the test slope to equal fSlope/fOPW (forecast slope and forecast orders per week). In operation 511, the forecast module can determine whether the facility has been open between 10 and 20 weeks. In operation 512, in response to determining the facility has been open between 10 and 20 weeks, the forecast module sets the fSlope to equal lesser or ns max slope or fSlope (fSlope is the variable in which the forecasted slope is stored). In operation 513, following operation 512 the forecast module can determine if the capacity management system setting is less than 2. In operation 514, in response to the capacity management system setting being less than 2, the forecast module can set the Max slope at 70. Setting the capacity management system setting to 1 (less than 2) indicates that the field manager wants to increase the capacity of the store (in terms of how many orders the store is allowed to pick and dispense per day) more conservatively. This forces the capacity management system to add no more than 10 order slots per day (70 per week). In one embodiment, the forecast for new stores open less than 10 weeks may be altered using machine learning. In operation 515, the forecast module determines whether the facility has been open less than or equal to 10 weeks. In response to determining the facility has not been open less than or equal to 10 weeks (i.e., open more than 10 weeks), in operation 521 the forecast module can determine whether fSlope is less than 0. In operation 522, in response to determining the fSlope is less than 0, the forecast module can set the fSlope to equal 0. In operation 524, following operation 522 or in response to determining fSlope is greater or equal to 0, the forecast module can set capacity management system setting at 0 or 2. In operation 526, in response to setting the capacity management system setting at 0, the forecast module can set fSlope to equal Conscapacity management system setting value*3. In operation 528 in response to setting the capacity management system setting at 2, the forecast module can set fSlope to equal fSlope*Aggressive capacity management system setting %. An aggressive capacity management system setting indicates that the daily order capacity (referenced previously) increases by 10% of the current daily capacity. In one embodiment, in operation 530 machine learning may be used to adjust the forecast based on the stores age (in weeks) and size (in order volume) using historic store cohort data. In operation 532, the process to find a slope can be terminated.

In an embodiment, in operation 540, a process to eliminate outliers can be initiated. In operation 542, the forecast module can calculate mean OPW. In operation 544, the forecast module and identify a minimum and maximum OPW based mean +/− standard deviation. In operation 546, the OPW values can be adjusted to within the minimum and maximum OPW values.

In operation 560, a process for finding express slopes indicative of the predicted change in express weekly order volume for the previously explained express picking operation can be initiated. In operation 562, the forecast module can determine whether WOD express orders are less than 5. In operation 564, in response to the forecast module determining the WOD express orders are less than 5, the forecast module can set OPW equal to Max OPW. In operation 566, the forecast module can set IPO to equal average IPO. In operation 568, in response to determining that WOD express orders are greater than or equal to 5, the forecast module can retrieve 5 weeks of OPW history and standard deviation. In operation 570, the forecast module can calculate the average slope. In operation 571, following operation 566 or operation 570, the forecast module can determine whether the slope is less than 0. In operation 572, in response to determining the slope is less than 0, the forecast module can set slope equal to 0. In operation 574 the forecast module can terminate the process.

Figure 6:
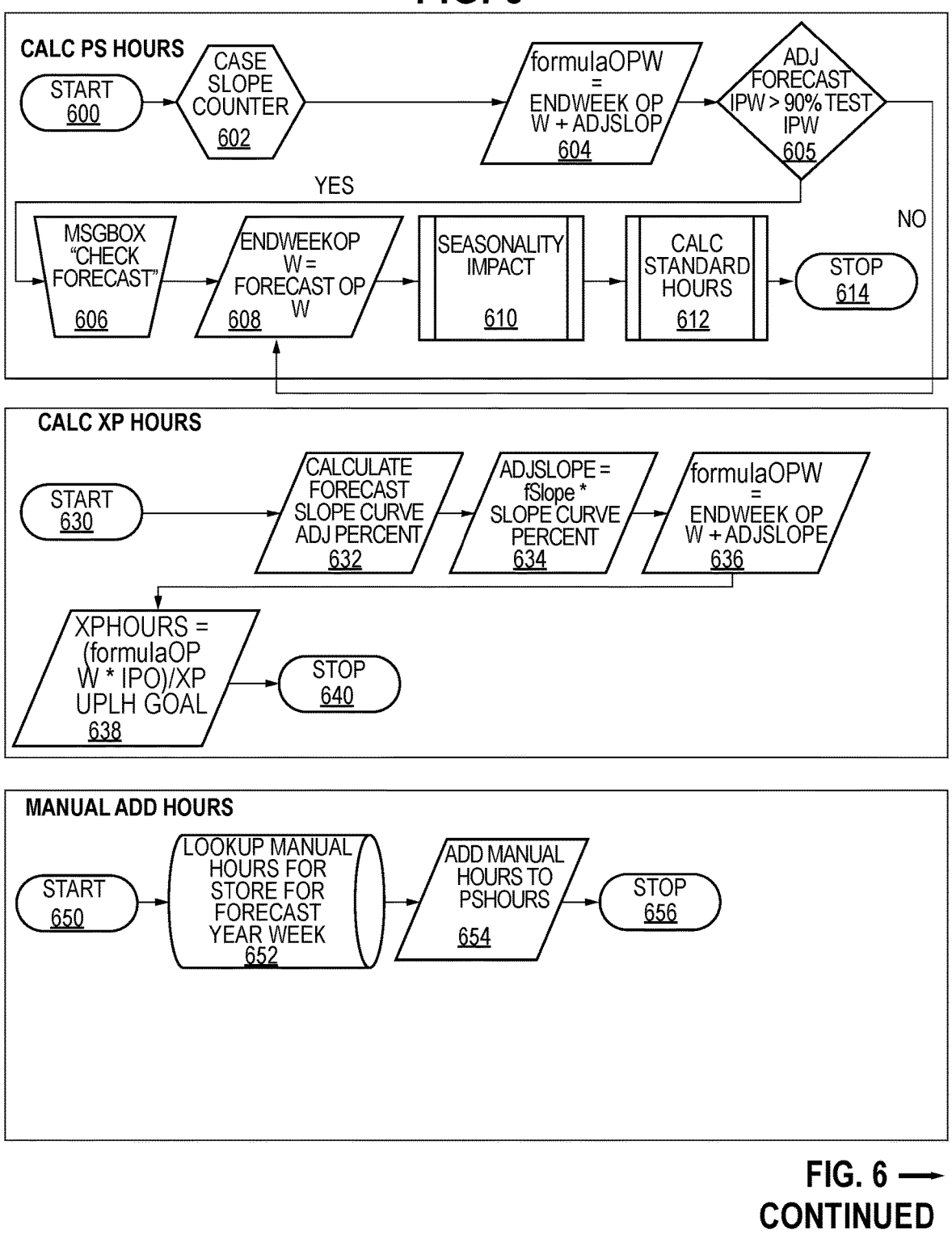
FIG. 6 depicts a process of generating hour data in accordance to an exemplary embodiment.
Figure 6:
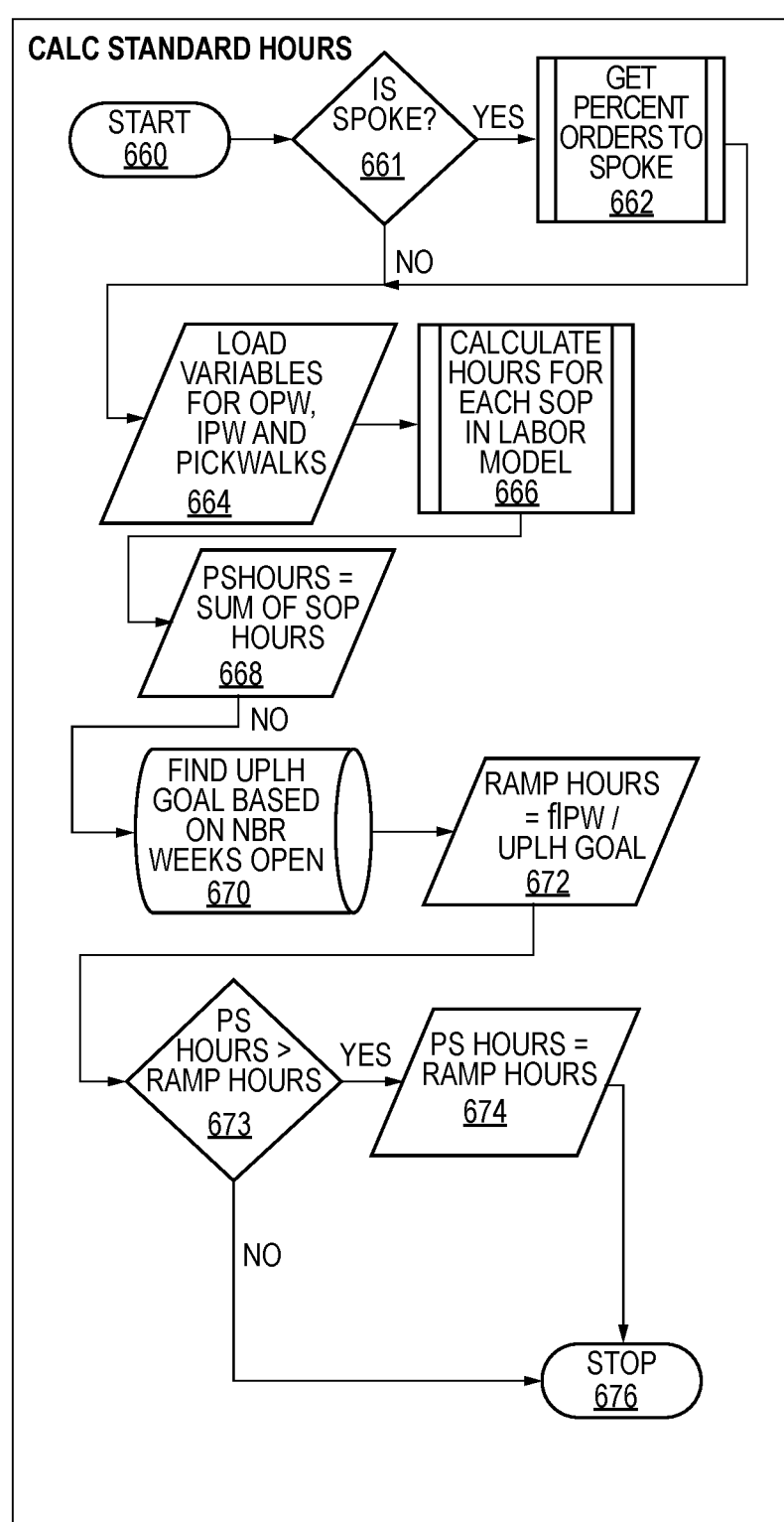

FIG. 6 depicts a process of generating hour data in accordance with an exemplary embodiment. In operation 600, the process for calculating PS hours can be initiated. In operation 602, a case slope counter can be executed by the forecast module (e.g., forecast module 155 as shown in FIG. 1). In operation 604 the forecast module can determine if the previous weeks values are higher or lower based on the calculated slope. In operation 605, the forecast module can determine whether the adjusted forecast IPW is greater than 90% of testIPW This is a validation step to ensure that a forecast doesn't under forecast to X degree (in this case more than a 10% drop in volume as this would be highly atypical. In operation 606, in response to the adjusted forecast IPW being greater than 90% of testIPW, the forecast module can generate a message box of "Check Forecast" as a result of the validation and notifies the support team that the results should be investigated. In operation 608, following operation 606 or in response to determining that the adjusted forecast is greater than 90% of testIPW in operation 605, the forecast module can set the EndweekOPW equal Forecast OPW. In operation 610, the forecast module can determine the seasonality impact. Seasonality analyses are completed quarterly. The results determine the weekly percent change by store caused by seasonality. A database table is loaded with these values so that the forecast process can include that percent change into a given weeks forecast results. In operation 612, the forecast module can calculate standard hours. Standard hours are calculated by passing a given number of orders and items into a labor model module which uses store specific engineered standards to determine how much time is required for each task of the in store ecommerce operation and the result is the total number of hours needed for that store, for that week, in the PS (or personal shopper) job code for scheduling. In operation 614, the process of calculating PS hours can be terminated.

In operation 630, XP hours may be calculated. In operation 632, the forecast module can calculate forecast slope curve adjustment percentage. In operation 634, the forecast module can set the adjSlope to equal fSlope*slope curve percent. In operation 636, the forecast module can set the formulaOPW equal to endWeekOPW plus adjSlope. In operation 638, the forecast module can set XPHours to equal (formula OPW*IPO)/XP UPLH Goal (units per labor hour productivity goal). In operation 640 the process to calculate XP hours can be terminated.

In operation 650, the process to calculate manual add hours can be initiated. In operation 652, the forecast module can retrieve manual hours for a facility forecast for a specified week of the year from the databases (e.g., databases 105 as shown in FIG. 1 including the facilities database 135; historical data database 137; and labor model data database 139). In operation 654, the forecast module can add the manual hours to the PS hours. In operation 656 the process to calculate manual add hours can be terminated.

In operation 660, the process to calculate standard hours can be initiated. In operation 661, the forecast module determines whether the facility is a spoke. In operation 662 in response to the facility being a spoke, the forecast module can retrieve percent of orders to the spoke. In operation 664, following operation 662 or in response to the forecast module determining the facility is not a spoke in operation 661, the forecast module can load variables for OPW, IPW and Pickwalks (a driver used in the engineered standards based labor model) into the databases. In operation 666, the forecast module can calculate hours for each SOP (standard operating procedure) in the labor model. The SOP defines the specific tasks associated with a process and the labor model us built from several processes, each requiring a standard amount of time to complete based on the metric relative to that SOP (metric such as items or orders). In operation 668, the forecast module can set the PSHours (personal shopper hours) to equal sum of SOP hours. Personal shoppers are the hourly associates who perform all activities in the process defined for in store ecommerce operations. In operation 670, in response to determining the facility has been open more than 20 weeks, the forecast module can find UPLH goal based number of weeks open. UPLH is units per labor hour. It is a productivity method that is used to calculate hours needed based on an items count in lieu of a labor model for stores open less than a given number of weeks. In operation 672, the forecast module can set Ramp Hours to equal fiPW/UPLH goal (forecast items divided by the UPLH goal) to determine the personal shopper hours. In operation 673, the forecast module can determine whether PS Hours are greater than Ramp Hours. In operation 674, in response to PS hours being greater than Ramp Hours, the forecast module can set PS Hours equal to Ramp Hours. In operation 676, following operation 639 or in response to determining that PS hours are not greater than Ramp Hours, the process to calculate standard hours can be terminated as stores that are new, based on a given number of weeks in operation, are given additional hours to become efficient by the forecast module. The ramp hours are those hours that are greater than the result of the hours calculated using the standards labor model. New stores get whichever hours are great (ramp vs standards).

Figure 7:
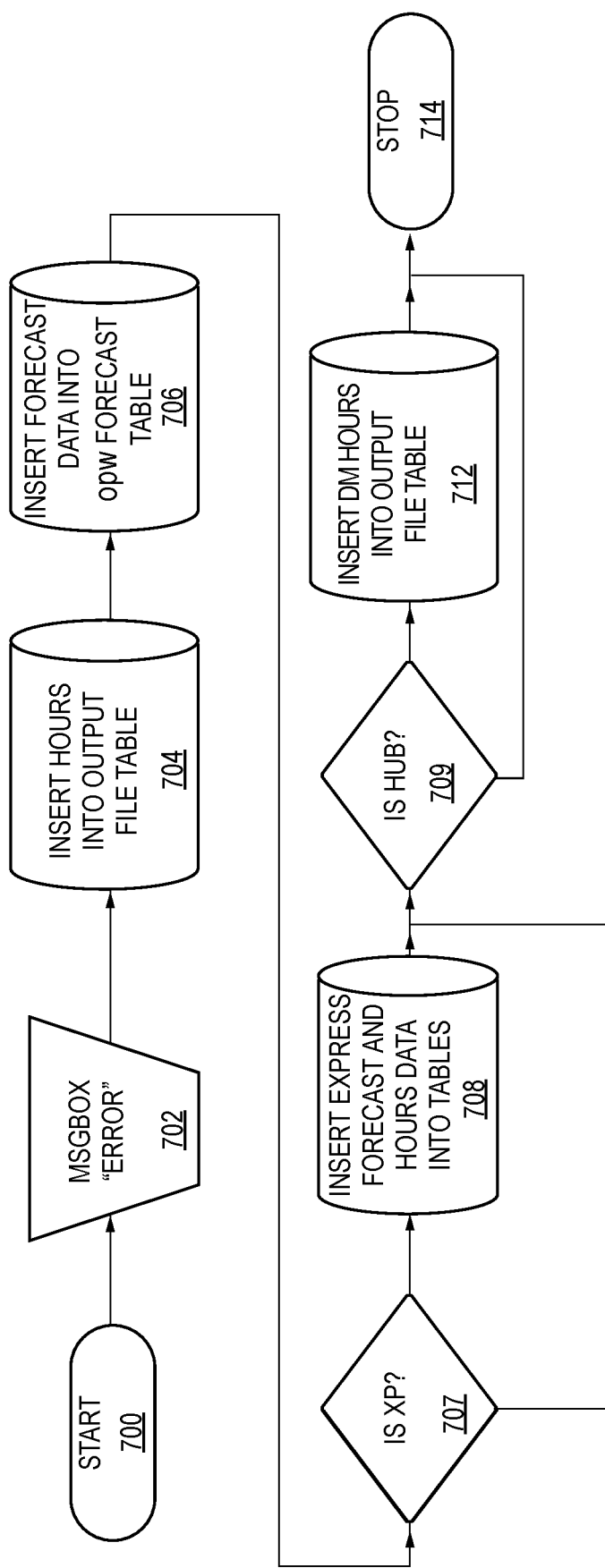
FIG. 7 depicts a process of calculating hour data in accordance to an exemplary embodiment.

FIG. 7 depicts a process of calculating hour data in accordance with an exemplary embodiment. In operation 700, the process of calculating hour data can be initiated. This is the calculation of hours needed to perform the forecast order volume which is then written to a database and used to generate scheduling reports and tools need by the store to schedule the correct number of associates. In operation 702, in response to determining the TtIPS Hours are less than 1, the forecast module can generate a message box reading "ERROR". In operation 704, in response to determining the TtIPS hours are not less than 1, the forecast module can insert hours into the output file table of the databases. In operation 706, the forecast module can insert forecast data into an opwForecast table in the databases. In operation 707, the forecast module can determine whether the facility is an XP facility. In operation 708, in response to determining, the facility is an XP facility, the forecast module can insert express forecast data into the table of the databases. In operation 709, following operation 708 or in response to determining the facility is not an XP facility in operation 707, the forecast module can determine whether the facility is a hub facility. In operation 710, in response to determining the facility is a hub facility, the forecast module can insert DM hours into the output file table in the databases to be used in scheduling. In operation 712, following operation 710 or in response to determining the facility is not a hub facility in operation 709, the process to calculate hour data can be terminated.

Figure 8:
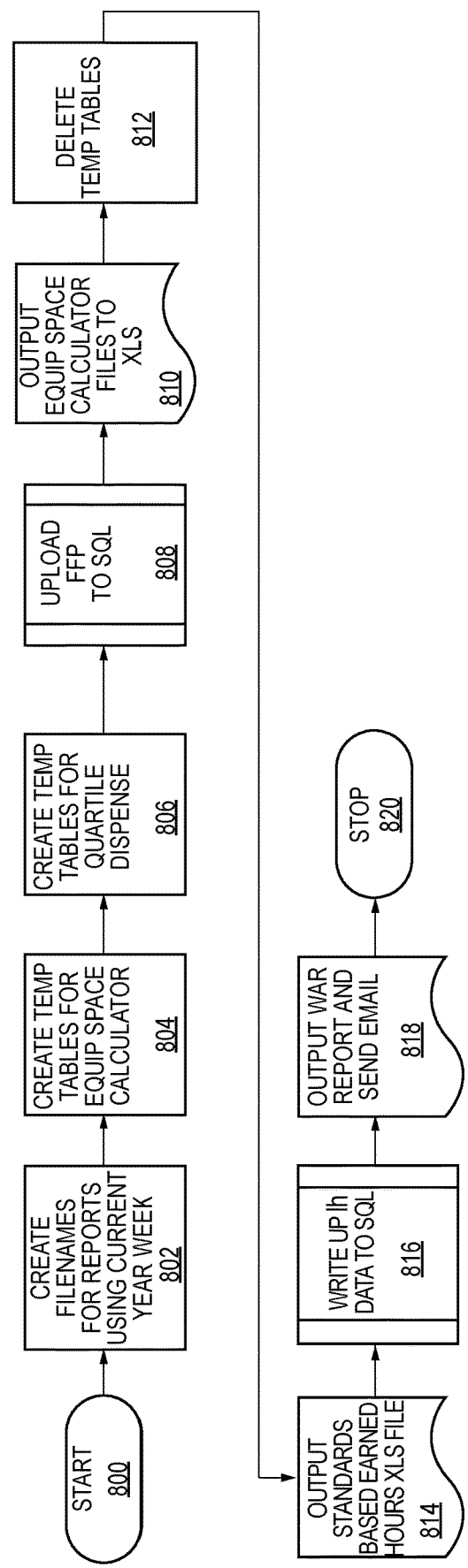
FIG. 8 depicts a process of generating an output from the databases in accordance with an exemplary embodiment.

FIG. 8 depicts a process of generating an output from the databases in accordance with an exemplary embodiment. In operation 800, the process of generating output from the databases (e.g., databases 105 as shown in FIG. 1 including the facilities database 135; historical data database 137; and labor model data database 139) can be initiated. In operation 802, the forecast module (e.g., forecast module 155 as shown in FIG. 1) can create filenames for reports using the current week in the year. In operation 804, the forecast module can create temp tables for an Equipment Space Calculator. The Equipment Space Calculator is a separate process and module which determines how much space and equipment is needed to pick and dispense a given number of orders and items in a specific store. In operation 806, the forecast module can create temp tables for Quartile Dispense. Quartile dispense is the percent of hours orders that are dispensed in an hourly quartile (15 minutes). In operation 808, the forecast module can upload an FFP (forecast for planning) tool used to share the results of the forecast to field managers to allow them to plan staffing for the future to SQL. In operation 810, the forecast module can output Equip Space calculator files to XLS (i.e., Microsoft Excel® files). In operation 812, the forecast module can delete temp tables. In operation 814, forecast module can output a standardBasedEarnedHours XLS file. In operation 816, the forecast module can write UPLH data to SQL. In operation 818, the forecast module can output a WAR (weekly accuracy report, which reports on the weekly accuracy of the forecast algorithm report. In operation 820, the process of generating output form the databases can be terminated.

Figure 9:
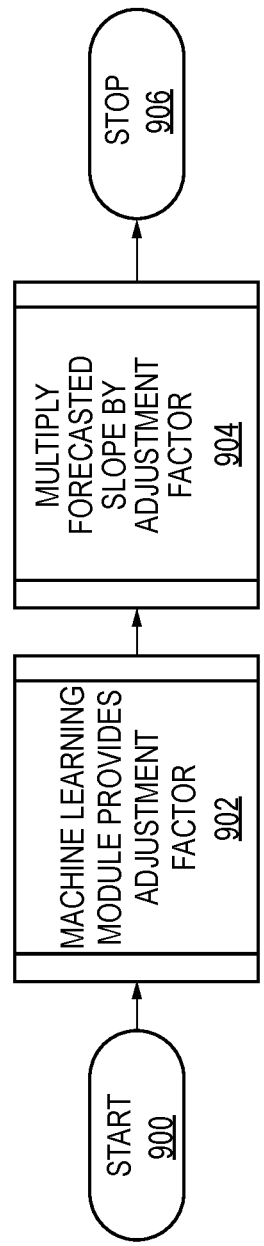
FIG. 9 depicts a process of adjusting the forecast slope by the adjustment factor in accordance with an exemplary embodiment.

FIG. 9 depicts a process of adjusting the forecast slope by the adjustment factor. In operation 900, the process of adjusting the forecast slope by the adjustment factor can be initiated. In operation 902 the machine learning module provides an adjustment factor for adjusting the forecast slope. In operation 904, the forecast module can multiply forecasted slope by the adjustment factor. In operation 906, the process for adjusting the forecast slope by the adjustment factor can be terminated.

The accuracy report data has the percent of forecast error or variance by store by week. Facilities can be grouped based on age, volume, format, and capacity. In one embodiment, an average variance by cohort by week is used to create a forecasted variance by cohort.

In one embodiment, prior to each forecast cycle a machine learning procedure evaluates the accuracy of the previous 5 weeks forecast (both in terms or orders and items forecasted) for each store and the median for two sets of cohort groups. One grouping is based on number of days the operation has been in place (age) and the other is size of the operation in terms of orders. A correction factor is generated for each store and cohort. If there is a "fuzzy match" amongst the majority of correction values then that store-specific correction is compared to previous correction values stored in a database table for that store to determine if there is a pattern that should be ignored. The comparison determines if the newly calculated correction value differs from the value already inserted for this store. This existing value is based on a long-range seasonal forecast adjustment process to determine weekly changes in volume based on historic, seasonal customer trends. If the correction value is not ignored it is written to a table which is then applied to the final forecasted slope during the forecast process.

Figure 10:
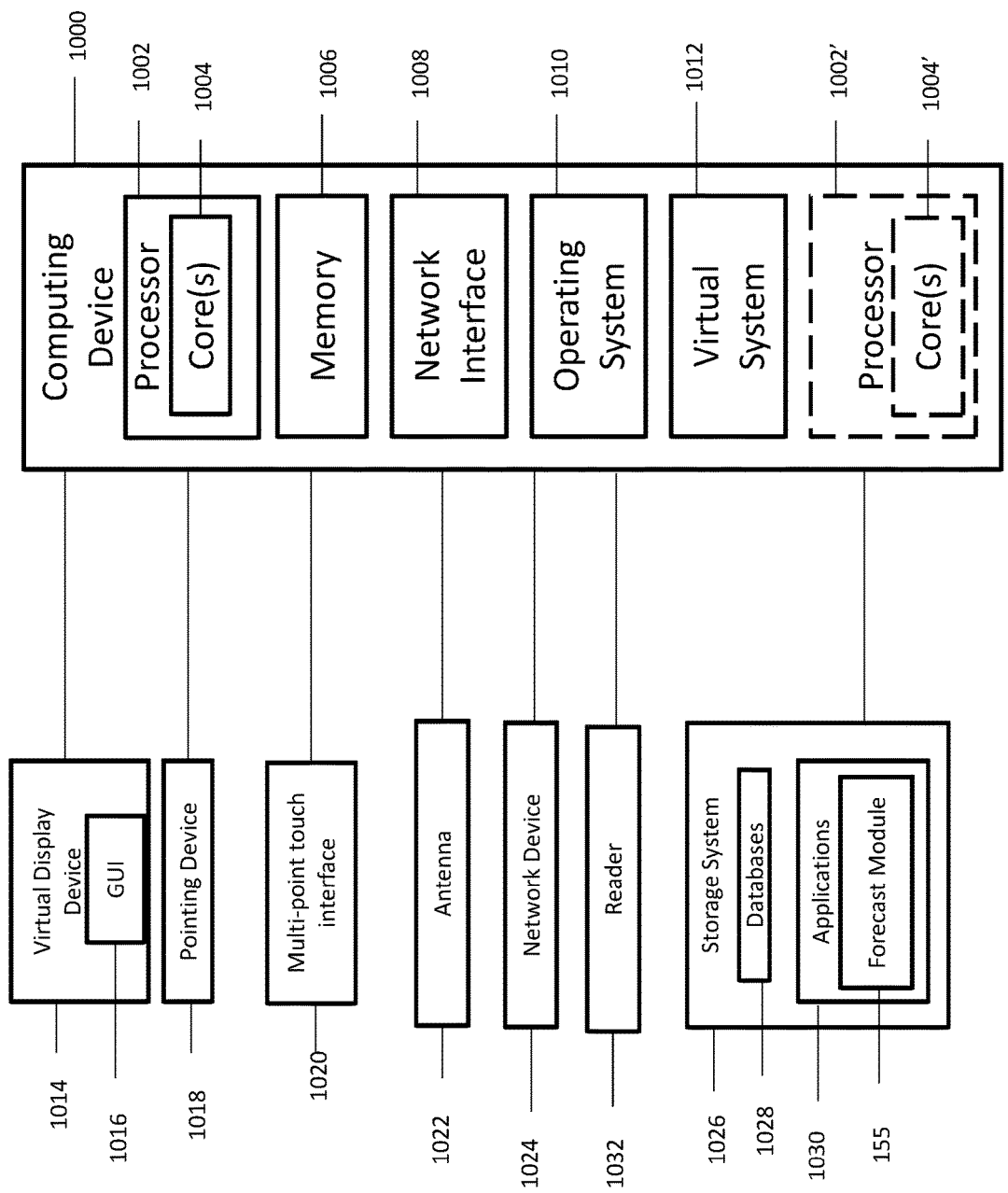
FIG. 10 is a block diagram illustrating of an exemplary computing device in accordance with exemplary embodiments of the present disclosure.

FIG. 10 is a block diagram of an example computing device for implementing exemplary embodiments. The computing device 1000 may be, but is not limited to, a smartphone, laptop, tablet, desktop computer, server or network appliance. The computing device 1000 can be embodied as part of the computing system, distributed computing system, and/or user device. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1006 included in the computing device 1000 may store computer-readable and computer-executable instructions or software (e.g., applications 1030, which can include the forecast module 155) for implementing exemplary operations of the computing device 1000. The computing device 1000 also includes configurable and/or programmable processor 1002 and associated core(s) 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for implementing exemplary embodiments. Processor 1002 and processor(s) 1002' may each be a single core processor or multiple core (1004 and 1004') processor. Either or both of processor 1002 and processor(s) 1002' may be configured to execute one or more of the instructions described in connection with computing device 1000.

Virtualization may be employed in the computing device 1000 so that infrastructure and resources in the computing device 1000 may be shared dynamically. A virtual machine 1012 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1014, such as a computer monitor, which may display one or more graphical user interfaces 1016, multi-touch interface 1020, a pointing device 1018, a scanner 1036 and a reader 1032.

The computing device 1000 may also include one or more storage devices 1026, such as a hard-drive, CD-ROM, or other computer readable media, for storing data and computer-readable instructions and/or software that implement exemplary embodiments (e.g., applications i.e. the control engine 180). For example, exemplary storage device 1026 can include one or more databases 1028 for storing information regarding facilities, historical data, and labor model data. The databases 1028 may be updated manually or automatically at any suitable time to add, delete, and/or update one or more data items in the databases.

The computing device 1000 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 1022 to facilitate wireless communication (e.g., via the network interface) between the computing device 1000 and a network and/or between the computing device 1000 and other computing devices. The network interface 1008 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run operating system 1010, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 1000 and performing the operations described herein. In exemplary embodiments, the operating system 1010 may be run in native mode or emulated mode. In an exemplary embodiment, the operating system 1010 may be run on one or more cloud machine instances.

Figure 11:
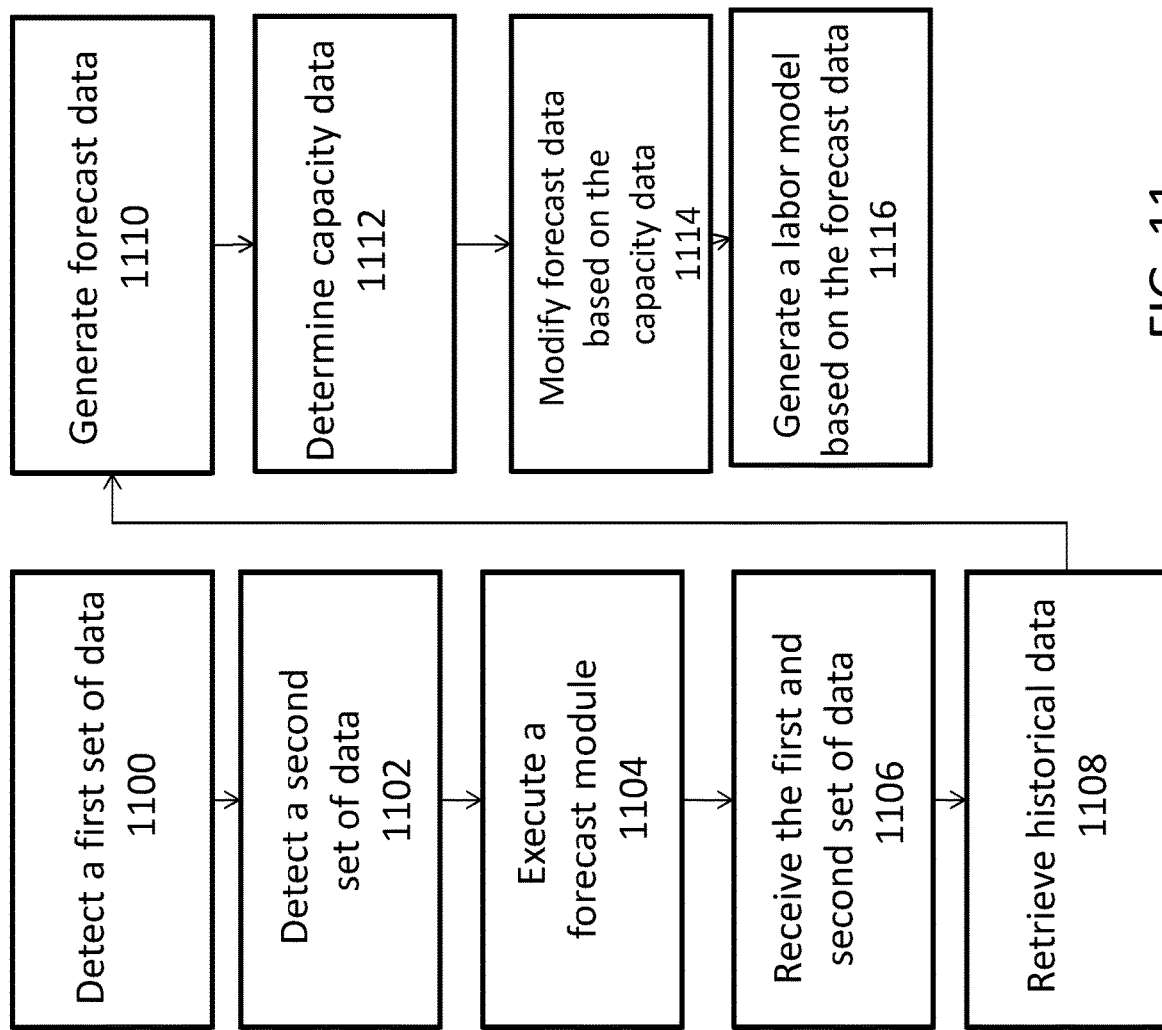
FIG. 11 is a flowchart illustrating an exemplary process in accordance with exemplary embodiments of the present disclosure.

FIG. 11 is a flowchart depicting the process of forecasting schedules of workers performed by the forecasting system in an exemplary embodiment. In operation 1100, a first set of sensors (e.g., first set of sensors 118 as shown in FIG. 1) disposed outside a facility can detect a first set of data. In operation 1102, a second set of sensors (e.g., second set of sensors 124 as shown in FIG. 1) disposed inside a facility can detect a second set of data. In operation 1104, a computing system (e.g., computing device 150 as shown in FIG. 1) in communication with the first set of sensors, second set of sensors, and a database, can execute a forecast module (e.g., forecast module 155 as shown in FIG. 1). In operation 1106, the forecast module can receive the first and second set of data from the first and second set of sensors. In operation 1108, the forecast module can retrieve historical data associated with different physical objects disposed in the facility. In operation 1110, the forecast module can generate forecast data indicating an amount of workers needing to be scheduled in the facility for a specified period of time, the forecast data associated with an amount of physical objects predicted to be retrieved from the facility based on the first set of data, the second set of data, and the historical data. In operation 1112, the forecast module can determine capacity data based on a maximum capacity of the facility to retrieve physical objects over the specified period of time. The maximum capacity is determined by several factors including, but not limited to, a number of totes (containers) that can be stored for in each temperature zone (ambient, chilled and frozen), the dispense to customer distribution of orders by day and hour, the average percent of orders dispensed per day, the max percent of orders picked up the first pickup slot, the max number of orders picked during the last two hours of the day. In operation 1114, the forecast module can modify the forecast data based on the capacity data. In operation 1116, the forecast module can generate a labor model based on the forecast data, the labor model indicating an amount of workers required to support the forecasted retrieval of physical objects from the facility.

Figure 12:
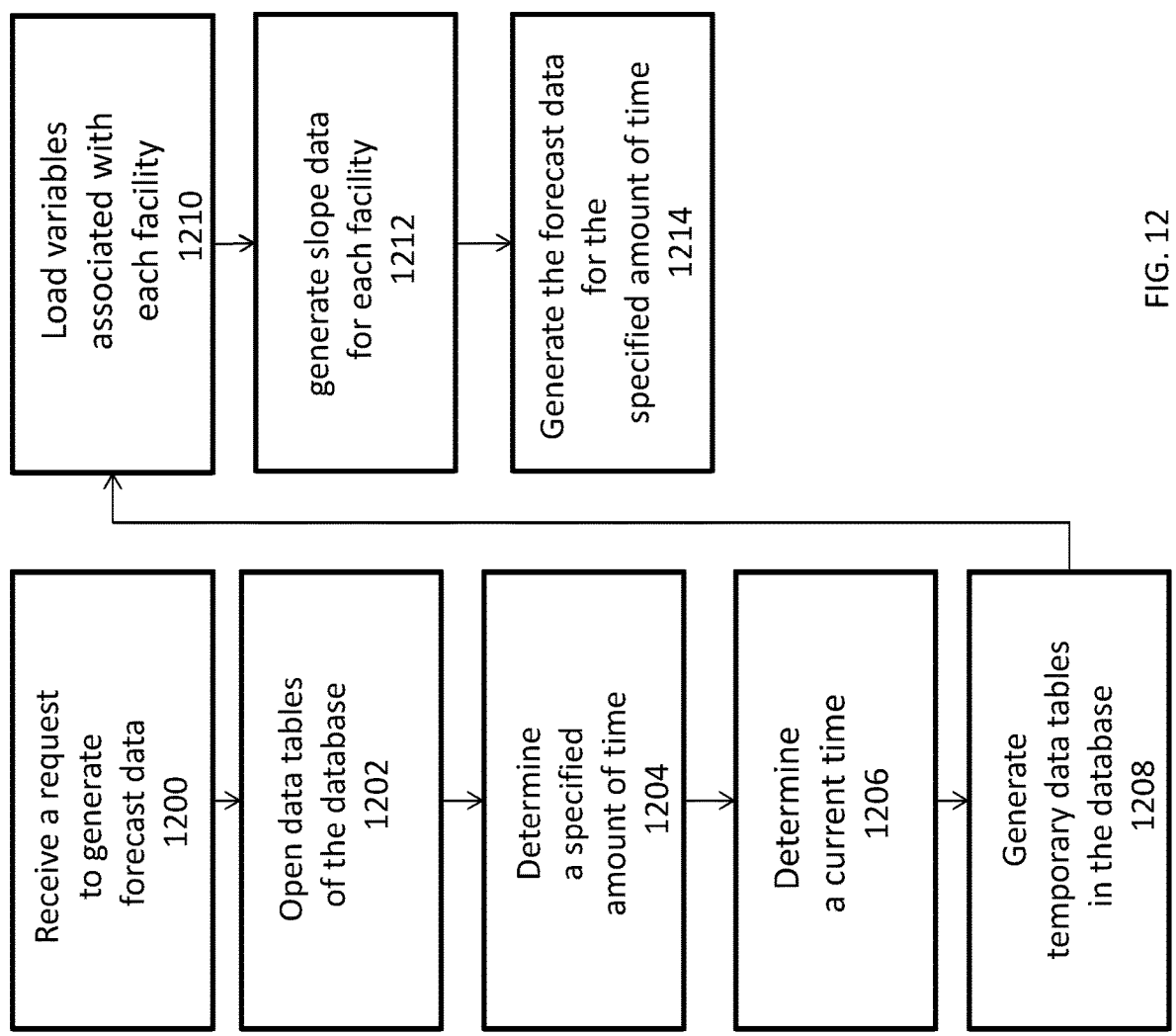
FIG. 12 is a flowchart illustrating an exemplary process in accordance with exemplary embodiments of the present disclosure.

FIG. 12 is a flowchart depicting the process of the forecasting system in accordance with an exemplary embodiment. In operation, 1200, a forecasting module (e.g., forecast module 155 as shown in FIG. 1) executed on a computing system (e.g., computing device 150) in communication with a database (e.g., databases 105 as shown in FIG. 1 including the facilities database 135; historical data database 137 and labor model data database 139) can receive a request to generate forecast data. In operation 1202, the forecasting module can open data tables of the database. In operation 1204, the forecast module can determine a specified amount of time associated with the forecast data. In operation 1206, the forecast module can determine a current time in relation to the specified amount of time associated with the forecast data. In operation 1208, the forecast module can generate temporary data tables in the database associated with delivery or retrieval of physical objects disposed in facilities. In operation 1210, the forecast module can load variables associated with each facility in the database. In operation 1212, the forecast module can generate slope data for each facility using inputs including data accessed from the open data tables in the database and the temporary data tables in the database associated with the delivery or retrieval of physical objects disposed in the facility. In operation 1214 the forecast module can generate the forecast data for the specified amount of time including physical object predictive data associated with a quantity of physical objects to be disposed in each facility of and a quantity of physical object to be retrieved from or delivered from each facility of facilities, using the generated slope data. The physical object predictive data can be iteratively updated based on updates to the slope data.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:
1. A forecasting system for forecasting an amount of workers needing to be scheduled at a facility, the system comprising:
   a first set of sensors disposed outside the facility and configured to detect a first set of data, wherein the first set of data is associated with an amount of cars outside the facility used to forecast an amount of workers needed to be scheduled in the facility;
   a second set of sensors disposed inside the facility and configured to detect a second set of data, wherein the second set of data is associated with physical objects disposed within the facility or an amount of customer traffic within the facility;
   a computing system in communication with the first set of sensors, the second set of sensors, and a database, the computing system configured to execute a forecast module that when executed:
   receives the first and second sets of data from the first and second sets of sensors;
   retrieves historical data associated with a plurality of physical objects disposed in the facility;
   generates forecast data indicating the amount of workers needing to be scheduled in the facility for a specified period of time, the forecast data associated with an amount of physical objects of the plurality of physical objects predicted to be retrieved from the facility based on the first set of data, the second set of data, and the historical data;
   determines capacity data based on a maximum capacity of the facility to retrieve physical objects over the specified period of time;
   modifies the forecast data based on the capacity data; and
   generates a labor model based on the forecast data, the labor model indicating the amount of workers required to support the forecasted retrieval of physical objects from the facility.

2. The system of claim 1, wherein the forecast module is configured to generate the forecast data over the specified period of time of four weeks or less.

3. The system of claim 1, wherein the forecast module is configured to remove outlier data from the forecasted amount of physical objects to be retrieved from the facility.

4. The system of claim 1, wherein the first set of sensors are disposed in a parking lot outside the facility.

5. The system of claim 4, wherein the first set of data is associated with vehicle data of vehicles parked in the parking lot.

6. The system of claim 1, wherein the historical data includes data associated with a frequency and the amount of physical objects retrieved from the facility over a specified amount of time of four weeks or less.

7. The system of claim 1, wherein the labor model includes a schedule of workers required at the facility over a specified amount of time.

8. The system of claim 1, wherein the forecast module is configured to dynamically update the forecast data or the labor model based on a change in the first set of data, the second set of data, or the historical data.

9. The system of claim 1, wherein the forecast module generates the forecast data based on the first set of data, the second set of data, the historical data and one or more of: a season, a time of day, a day of a week, or a weather condition.

10. The system of claim 1, wherein the first set of data is further associated with at least one of objects or people outside the facility.

11. A computing device-implemented forecasting method for forecasting an amount of workers needing to be scheduled at a facility, the computing device including one or more processors, the method comprising:
   detecting, via a first set of sensors disposed outside the facility, a first set of data, wherein the first set of data is associated with an amount of cars outside the facility used to forecast the amount of workers needed to be scheduled in the facility;
   detecting, via a second set of sensors disposed inside the facility, a second set of data, wherein the second set of data is associated with physical objects disposed within the facility or an amount of customer traffic within the facility;
   executing a forecast module on the computing device, the computing device in communication with the first set of sensors, the second set of sensors, and a database;
   receiving, via the forecast module, the first and second sets of data from the first and second sets of sensors;
   retrieving, via the forecast module, historical data associated with a plurality of physical objects disposed in the facility;
   generating, via the forecast module, forecast data indicating the amount of workers needing to be scheduled in the facility for a specified period of time, the forecast data associated with an amount of physical objects of the plurality of physical objects predicted to be retrieved from the facility based on the first set of data, the second set of data, and the historical data;
   determining, via the forecast module, capacity data based on a maximum capacity of the facility to retrieve physical objects over the specified period of time;
   modifying, via the forecast module, the forecast data based on the capacity data; and
   generating, via the forecast module, a labor model based on the forecast data, the labor model indicating an amount of workers required to support the forecasted retrieval of the physical objects from the facility.

12. The method of claim 11, further comprising:
   generating, via the forecast module, the forecast data over the specified period of time of four weeks or less.

13. The method of claim 11, further comprising:
   removing, via the forecast module, outlier data from the forecasted amount of physical objects to be retrieved from the facility.

14. The method of claim 11, wherein the first set of sensors are disposed in a parking lot outside the facility.

15. The method of claim 14, wherein the first set of data is associated with vehicle data of vehicles parked in the parking lot.

16. The method of claim 11, wherein the historical data includes data associated with a frequency and the amount of physical objects retrieved from the facility over a specified amount of time of four weeks or less.

17. The method of claim 11, wherein the labor model includes a schedule of workers required at the facility over a specified amount of time.

18. The method of claim 11, further comprising:
   dynamically updating, via the forecast module, the forecast data or the labor model based on a change in the first set of data, the second set of data, or the historical data.

19. The method of claim 11, further comprising:
   generating, via the forecast module, the forecast data based on the first set of data, the second set of data, the historical data and one or more of: season, time of day, day of a week, or weather.

20. The method of claim 11, wherein the first set of data is further associated with at least one of objects or people outside the facility.

* * * * *